US008570207B1

(12) United States Patent
Dawood et al.

(10) Patent No.: US 8,570,207 B1
(45) Date of Patent: Oct. 29, 2013

(54) METHOD, TECHNIQUE, AND SYSTEM FOR DETECTING BRILLOUIN PRECURSORS AT MICROWAVE FREQUENCIES FOR ENHANCED PERFORMANCE IN VARIOUS APPLICATIONS

(75) Inventors: Muhammad Dawood, Las Cruces, NM (US); Habeeb Ur Rahman Mohammed, Richardson, TX (US); Ana Vazquez Alejos, Las Cruces, NM (US)

(73) Assignee: Arrowhead Center, Inc., Las Cruces, NM (US)

( * ) Notice: Subject to any disclaimer, the term of this patent is extended or adjusted under 35 U.S.C. 154(b) by 203 days.

(21) Appl. No.: 13/156,998

(22) Filed: Jun. 9, 2011

Related U.S. Application Data

(60) Provisional application No. 61/353,136, filed on Jun. 9, 2010.

(51) Int. Cl.
*G01S 13/89* (2006.01)
(52) U.S. Cl.
USPC ............................................. 342/22; 342/179
(58) Field of Classification Search
USPC .................................................. 342/22, 179
See application file for complete search history.

(56) References Cited

U.S. PATENT DOCUMENTS

| 3,903,520 | A | | 9/1975 | Shostak |
|---|---|---|---|---|
| 4,706,031 | A | * | 11/1987 | Michiguchi et al. .......... 324/337 |
| 5,315,561 | A | | 5/1994 | Grossi |
| 5,357,253 | A | | 10/1994 | Van Etten et al. |
| 5,486,833 | A | * | 1/1996 | Barrett ........................... 342/204 |
| 5,502,444 | A | | 3/1996 | Kohlberg |
| 5,644,314 | A | * | 7/1997 | Ahmad et al. ................... 342/22 |
| 5,917,179 | A | * | 6/1999 | Yao ........................... 250/227.11 |
| 5,952,954 | A | * | 9/1999 | Beckner .......................... 342/22 |
| 6,094,157 | A | * | 7/2000 | Cowdrick ........................ 342/22 |
| 6,429,801 | B1 | * | 8/2002 | Pergande ......................... 342/21 |
| 6,864,826 | B1 | * | 3/2005 | Stove ............................... 342/22 |
| 7,167,621 | B2 | * | 1/2007 | Manyam et al. .............. 385/123 |
| 7,450,052 | B2 | * | 11/2008 | Hausner et al. ................. 342/22 |
| 7,777,594 | B2 | | 8/2010 | Eleftheriades |
| 8,253,619 | B2 | * | 8/2012 | Holbrook et al. ............... 342/22 |
| 2006/0093294 | A1 | * | 5/2006 | Manyam et al. .............. 385/123 |
| 2007/0188855 | A1 | * | 8/2007 | Shishkov et al. ............. 359/362 |
| 2011/0280584 | A1 | * | 11/2011 | Tankala et al. ................ 398/141 |

OTHER PUBLICATIONS

Alejos, A.V.; Dawood, M.; Mohammed, H.U.; , "Analysis of Brillouin Precursor Propagation Through Foliage for Digital Sequences of Pulses," Geoscience and Remote Sensing Letters, IEEE , vol. 8, No. 1, pp. 59-63, Jan. 2011.*

Alejos, A.V.; Dawood, M.; Sun, J.X.; , "Dynamical evolution of Brillouin precursors in multilayered sea water-based media," Antennas and Propagation (EUCAP), Proceedings of the 5th European Conference on , vol., no., pp. 1357-1361, Apr. 11-15, 2011.*

(Continued)

*Primary Examiner* — John B Sotomayor
(74) *Attorney, Agent, or Firm* — Justin R. Jackson; Deborah A. Peacock; Peacock Myers, P.C.

(57) ABSTRACT

A method, system, and software for using Brillouin precursors to enhance UWB, RF, and Microwave Remote Sensing systems by providing greater penetration depths and or resolution. Embodiments also include methods, software, and systems which provide a method to detect the formation of Brillouin precursor waveforms in any given dispersive media, for any transmitted signal and any frequency range.

39 Claims, 10 Drawing Sheets

(56) References Cited

OTHER PUBLICATIONS

Hao Zhang; Guoping Zhang; Gulliver, T.A.; Bing Zheng; , "Brillouin precursors propagation through sea water at GHz frequency," Oceans, 2012 , vol., no., pp. 1-6, Oct. 14-19, 2012.*

Oughstun, K.E.; , "Optimal pulse penetration in Rocard-Powles-Debye model dielectrics using the Brillouin precursor," Antennas and Propagation Society International Symposium, 2004. IEEE , vol. 4, no., pp. 4228-4231 vol. 4, Jun. 20-25, 2004.*

Oughstun, K.E.; , "Dynamical evolution of the Brillouin precursor in Rocard-Powles-Debye model dielectrics," Antennas and Propagation, IEEE Transactions on , vol. 53, No. 5, pp. 1582-1590, May 2005.*

Aaviksoo, J. et al., "Observation of optical precursors at pulse propagation in GaAS", Physical Review A, vol. 44, No. 9, American Physical Society, Nov. 1, 1991, 5353-5356.

Albanese, R. et al., "Short-Rise-Time Microwave Pulse Propagation Through Dispersive Biological Media", J. Opt. Soc. Am. A, vol. 6, No. 9, Sep. 1989, 1441-1446.

Alejos, A. V. et al., "Estimation of Power Extinction Factor in Presence of Brillouin Precursor Formation Through Dispersive Media", J. of Electromagn. Waves and Appl., vol. 25, 2011, 455-465.

Alejos, Ana V. et al., "Measurement and Analysis of Propagation Mechanisms at 40 GHz: Viability of Site Shielding Forced by Obstacles", IEEE Transactions on Vehicular Technology, vol. 57, No. 6, IEEE, Nov. 2008, 3369-3380.

Bacon, Larry , "Calculations of Precursor Propagation in Dispersive Dielectrics", Sandia National Laboratories Report SAND2003-3040, Aug. 2003.

Blaschak, J. G. et al., "Precursor propagation in dispersive media from short-rise-time pulses at oblique incidence", J. Opt. Soc. Am A, vol. 12, No. 7, Jul. 1995, 1501-1512.

Cartwright, Natalie A. et al., "Pulse centroid velocity of the Poynting vector", J. Opt. Soc. Am. A, vol. 21, No. 3, Optical Society of America, Mar. 2004, 439-450.

Choi, Seung-Ho et al., "Observation of Optical Precurosrs in Water", Physical Review Letters, vol. 92, No. 19, American Physical Society, May 14, 2004, 193903-1-193903-3.

Chu, S. et al., "Linear Pulse Propagation in an Absorbing Medium", Physical Review Letters, vol. 48, No. 11, American Physical Society, Mar. 15, 1982, 738-741.

Du, Shengwang et al., "Observation of optical precursors at the biphoton level", Optics Letters, vol. 33, No. 18, Optical Society of America, Sep. 15, 2008, 2149-2151.

Firoozabadi, Reza et al., "Subsurface Sensing of Buried Objects Under a Randomly Rough Surface Using Scattered Electromagnetic Field Data", IEEE Transactions on Geoscience and Remote Sensing, vol. 56, No. 1, IEEE, Jan. 2007, 104-117.

Ghodgaonkar, D. K. et al., "Free-Space Measurement of Complex Permittivity and Complex Permeability of Magnetic Materials at Microwave Frequencies", IEEE Transactions on Instrumentation and Measurement, vol. 39, No. 2, IEEE, Apr. 1990, 387-394.

Griffiths, H. D. et al., "Use and application of precursor waveforms", 1st EMRS DTC Technical Conference, Edinburgh, U.K., 2004.

Jeong, Heejeong et al., "Direct Observation of Optical Precursors in a Region of Anomalous Dispersion", Quantum Electronics and Laser Science Conference (QELS), 2005, 241-243.

Jeong, Heejeong et al., "Direct Observation of Optical Precursors in a Region of Anomalous Dispersion", Physical Review Letters, vol. 96, American Physical Society, Apr. 14, 2006, 143901-1-143901-4.

Joseph, Rose M. et al., "Direct time integration of Maxwell's equations in linear dispersive media with absorption for scattering and propagation of femtosecond electromagnetic pulses", Optics Letters, vol. 16, No. 18, Optical Society of America, Sep. 15, 1991, 1412-1414.

King, Ronold W. , "The Propagation of a Gaussian Pulse in Sea Water and Its Application to Remote Sensing", IEEE Transactions on Geoscience and Remote Sensing, vol. 31, No. 3, IEEE, May 1993, 595-605.

Leubbers, Raymond et al., "Comments on Pulse Propagation in a Linear, Causally Dispersive Medium", Proceedings of the IEEE, vol. 81, No. 4, IEEE, Apr. 1993, 631-639.

Margetis, D. , "Pulse Propagation in Sea Water: The Modulated Pulse", Progress in Electromagnetics Research, vol. 26, 2000, 89-110.

Melamed, Timor et al., "Pulsed-beam propagation in lossless dispersive media. I. Theory", J. Opt. Soc. Am. A, vol. 15, No. 5, Optical Society of America, May 1998, 1268-1276.

Meyer, Franz et al., "The Potential of Low-Frequency SAR Systems for Mapping Ionospheric TEC Distributions", IEEE Geoscience and Remote Sensing Letters, vol. 3, No. 4, IEEE, Oct. 2006, 560-564.

Mironov, Valery L. et al., "Temperature-Dependable Microwave Dielectric Model for an Arctic Soil", IEEE Transactions on Geoscience and Remote Sensing, vol. 48, No. 6, IEEE, Jun. 2010, 2544-2556.

Mohammed, H.U. R. et al., "Software tool for simulation of Brillouin Precursors in Dispersive Dielectrics", IEEE APS Symposium, Toronto, Canada, Jul. 2010.

Ni, Xiaohui et al., "Brillouin precursor propagaion in the THz region in Lorentz media", Optics Express, vol. 14, No. 9, OSA, May 1, 2006, 4188-4194.

Oughston, Kurt E. et al., "On the accuracy of asymptotic approximations in ultrawideband signal, ultrashort-pulse, time-domain electromagnetics", IEEE Antennas and Propagation Society Symposium, vol. 2, 2000, 685-688.

Oughstum, Kurt E. , "On the Use & Application of Precursor Waveforms", 13th International Symposium on Antenna Technology and Applied Electromagnetics and the Canadian Radio Sciences Meeting, Banf, Alberta, Canada, Feb. 15-18, 2009.

Oughstun, Kurt E. , "Electromagnetic and Optical Pulse Propagation 2", Springer-Verlag, Berlin, Germany, 2009, 657-669.

Oughstun, Kurt E. , "On the Myth of Superluminality in Dispersive Pulse Propagation", Quantum Optics Workshop, University of California at Santa Barbara, Jul. 2002.

Pleshko, Peter et al., "Experimental Observation of Sommerfeld and Brillouin Prevursors in the Microwave Domain", Physical Review Letters, vol. 22, No. 22, Jun. 2, 1969, 1201-1204.

Prokopidis, K. P. et al., "An FDTD Algorithm for Wave Propagation in Dispersive Media Using Higher-O(rder Schemes", J. of Electromagn. Waves and Appl., vol. 18, No. 9, 2004, 1171-1194.

Ribeiro, Filipe J. et al., "Amplifying Sommerfeld precursors with producing a discontinuous index of refraction with gains and losses", Physical Review E, vol. 64, American Physical Society, 2001, 046602-1-046602-5.

Safian, Reza et al., "Asymptotic description of wave propagation in an active Lorentzian medium", Physical Review E, vol. 75, American Physical Society, 2007, 066611-1-066611-8.

Sakai, M. et al., "Femtoseconde Optical Precursors in Exciton Resonant Region", Opt. Soc. Am., 2000, 159-151.

Sakai, M. et al., "Polariton pulse propagation at exciton resonance in CuCl: Polariton beat and optical precursor", Physical Review B, vol. 66, American Physical Society, 2002, 033302-1-033302-4.

Schwartz, R. C. et al., "Complex Permittivity Model for Time Domain Reflectrometry Soil Water Content Sensing: I. Theory", Soil Science Society of America Journal, vol. 73, No. 3, 2009, 886-897.

Song, Jiming et al., "Propagation of EM Pulses Excited by an Electric Dipole in a Conducting Medium", IEEE Transactions on Antennas and Propagation, vol. 41, No. 10, IEEE, Oct. 1993, 1414-1421.

Sundberg, Garth et al., "Modeling Rough-Surface and Granular Scattering at Terahertz Frequencies Using the Finite-Difference Time-Domain Method", IEEE Transactions on Geoscience and Remote Sensing, vol. 48, No. 10, IEEE, Oct. 2010, 3709-3719.

Trizna, Dennis B. et al., "Brillouin revisited: Signal velocity definition for pulse propagation in a medium with resonant anomalous dispersion", Radio Science, vol. 17, No. 5, American Geophysical Union, Sep. 10, 1982, 1169-1180.

Van Der Kruk, Jan et al., "Fundamental and Higher Mode Inversion of Dispersed GPR Waves Propagating in an Ice Layer", IEEE Transactions on Geoscience and Remote Sensing, vol. 45, No. 8, IEEE, Aug. 2007, 2483-2491.

(56) References Cited

OTHER PUBLICATIONS

Yahalom, Asher et al., "Control of wave propagation in a dielectric medium by tailoring its dispersive properties", Journal of Non-Crystalline Solids, vol. 351, Elsevier B.V., 2005, 2922-2924.

Yavuz, Mehmet E. et al., "Frequency Dispersion Compensation in Time Reversal Techniques for UWB Electromagnetic Waves", IEEE Geoscience and Remote Sensing Letters, vol. 2, No. 2, IEEE, Apr. 2005, 233-237.

* cited by examiner

METHOD, TECHNIQUE, AND SYSTEM FOR DETECTING BRILLOUIN PRECURSORS AT MICROWAVE FREQUENCIES FOR ENHANCED PERFORMANCE IN VARIOUS APPLICATIONS

This application claims priority to and the benefit of the filing of U.S. Provisional Patent Application Ser. No. 61/353,136, entitled "Detection of Precursor Waveforms", to Muhammad Dawood et al., filed on Jun. 9, 2010, and the specification and claims thereof are incorporated herein by reference.

BACKGROUND OF THE INVENTION

1. Field of the Invention (Technical Field)

Embodiments of the present invention relate to a method, system, and/or technique for detecting the formation of the Brillouin precursor waveforms produced by the propagation of any transmitted signal through a dispersive media. Embodiments of the present invention also relate to a method, system, and/or technique, to process evolving Brillouin precursors as a result of an EM wave propagating through dispersive media, such as soil, foliage, water, walls, and human tissues at microwave frequencies.

2. Description of Related Art

The propagation of electromagnetic (EM) waves through a linear, temporally dispersive medium is a classic, on-going problem. It has assumed significant importance in the recent past, particularly, for systems operating with EM pulses of extremely short duration and/or of ultrawideband (UWB) frequency spectrum; the UWB spectrum is needed for finer range resolution in imaging systems, and for higher data rates in communication. The earliest research on the subject appears to have originated in or around the earlier part of the nineteenth century by various researchers working on the phenomenon of dispersion of light. Subsequently, a study around the year 1914 indicated the formation of "forerunners" or "precursors" arising out of electromagnetic (EM) propagating waves in dispersive media. The first and the second of these forerunners are also now known as the Sommerfeld, and the Brillouin precursors, respectively. The theory related to these waveforms could not be further understood and applied due to the intractable nature of the mathematics governing these waveforms. In dispersive media, each frequency component travels with its own phase velocity and undergoes a different absorption rate. These two effects determine the structure of the propagating fields at a given distance into the medium, resulting in fields called precursors.

In 1969, one of the first studies to demonstrate the existence of the precursors at RF and Microwave frequencies was conducted in a waveguide, P. Pleshko, I. Palózc, "Experimental observation of Sommerfeld and Brillouin precursors in the microwave domain", Physical Review Letters, vol. 22, issue 22, Jun. 1969. It is apparently the only one to refer to the observed transient response as precursors. The conditions in under which that data was obtained were very restrictive and particular. For example, it was conducted in an air-filled waveguide and measured in the frequency region wherein the phase and attenuation constants show a dispersive behavior. This situation represents a virtual dispersive material and not a physical material. This situation represents a virtual dispersive material and not a physical material. Remaining published experimental work are related to optical frequencies, and they involve measurements in mercury, optical fibers, and other systems not valid for microwave UWB bands.

In the more recent past, asymptotic analysis has provided an approximate closed-form solution for an otherwise largely intractable mathematical problem. The asymptotic analysis has analytically shown the influence of Brillouin precursors on signal arrival and pulse distortion in dispersive media, concluding that Brillouin precursors become a predominant component at depths greater than one absorption depth at the carrier frequency of the signal. In brief, the Brillouin precursor is characterized by (a) algebraically attenuating peak amplitude with propagation distance z (i.e. signal strength proportional to $z^{-k}$, k being a medium-dependent constant) compared to that $e^{-\alpha f(0) \cdot z}$ of the exponentially decaying EM field at the carrier frequency $f_0$; and (b) the center of the spectrum of the precursor downshifts with propagation distance z.

That analysis, however, was limited to theoretical investigations only. It could not yet be used in any experimental system operating at Radio Frequency (RF) and Microwave frequencies, because: (1) non-familiarity of various researchers with the concept of precursors; (2) not very many researchers are working in this area because of (1); (3) efforts in the past to observe these waveforms experimentally were not successful, thereby restricting this field to simulations only, particularly at RF and Microwave bands; and (4) non-availability of methods and techniques to demonstrate the practical existence of these waveforms at RF and Microwave regions.

The other published experimental works such as K. E. Oughstun and G. C. Sherman. Electromagnetic and Optical Pulse Propagation, Volume 2. Ed. Berlin, Germany: Springer-Verlag, 2009, pages 656-669, are limited to optical frequencies, and they involve measurements in mercury, optical fibers, and other systems not valid for the microwave band. The experimental detection of precursor waveforms at RF and microwave frequencies is of utmost importance since these frequencies are commonly used in numerous applications where optical frequencies do not provide desirable results. Additionally, the known experimental approaches are based on measurements performed in the time domain, thus making their implementation difficult due to the more complex instrumentation which is required. Additionally, in the time domain approach, the experimental observation of the Brillouin precursor must be repeated for each different pulse. This extends the time needed, and therefore the measurement conditions can suffer from conditional deviations, such as slight changes in temperature, humidity, and salinity of the material, thus providing less accurate results because such variables can influence the electrical conductivity of the dispersive material, $\sigma_0$ [S/m], thereby producing different and non-consistent results.

The received pulses are usually processed by a dispersion compensation filter that tries to cancel the frequency dispersion introduced by propagation through a dispersive media. But these filters do not fully compensate the dispersion phenomena, specially the formation of Brillouin precursors, or forerunners, that leads to the pulse spreading effect. This effect increases the range uncertainty radar feature if an application through or on dispersive media is attempted. Accordingly, this temporal width always exists and depends exclusively of the material intrinsic parameters. If digital waveforms are used in transmission, some classical reception filter techniques, such as matched filters, encounter this uncertainty because of the broadening suffered by the transmitted pulses. There is thus a need for a method, apparatus, and system capable of analyzing the formation of these forerunners to achieve an optimum design of receiver structures to mitigate the undesired impairment and ensuring a minimum distortion reception in the frame of Ultra-wide Band ("UWB") radar.

Very few experimental studies have been reported in the literature to experimentally detect, process, and analyze precursors at microwave frequencies. In "Experimental observation of Sommerfeld and Brillouin precursors in the microwave domain", Physical Review Letters, 1969, 22, (22), pp. 1201-1204, Pleshko, P., and Palózc, I., conducted an experiment using an air-filled waveguide in the vicinity of a cutoff frequency representing a virtual dispersive material and not a physical material.

U.S. Pat. No. 6,429,801 discloses the use of precursor waveforms. However, it cannot be adopted readily for various applications because it involves just one kind of pulse which requires to divide the sine carrier modulated pulse and both divided signals are phase modulated to produce the phase reversal so as the precursor is formed on the signal to be transmitted. The target application of that approach is to determine the possible material properties associated with the object detected by the radar. That approach also limits the transmit power of the GPR system in which it is intended to be used and thus, restricting the overall dynamic range of the system. Further, that approach is based on an impulse radar technology, requiring specialized hardware to generate well-defined pulses with a sharp rise and fall time. Its utility is thus further limited in typical radar applications due to the power and signal constraints. Additionally, the invention by U.S. Pat. No. 6,429,801 does not mention explicitly that the formed precursor is the Brillouin precursor; it identifies transient signals as first and second precursors.

However, up to present, despite of the evident advantages, the study of this phenomenon has been constrained by the inexistence of a reliable method valid to detect its formation in actual media.

BRIEF SUMMARY OF THE INVENTION

An embodiment of the present invention relates to a method for improving electromagnetic propagation through a dispersive medium which includes predicting and detecting the formation and power decay of one or more Brillouin precursors in the frequency domain for an electromagnetic radiated signal passing through the dispersive medium, transmitting and receiving electromagnetic radiation through the dispersive medium, and making changes based on the one or more detected Brillouin precursors. The method can also include making changes to a transmitted signal. The changes can optionally be done adaptively. The adaptive changes can optionally be made via a software function. Optionally, making changes can include making signal processing changes for the received electromagnetic radiation, and/or adaptively changing the signal processing.

In one embodiment, the electromagnetic radiated signal can include a radio frequency signal. The electromagnetic frequency signal and/or the electromagnetic radiated signal can optionally include a radio frequency signal, a microwave frequency signal, and/or a modulated electromagnetic waveform. The electromagnetic frequency, electromagnetic radiated signal, and/or modulated electromagnetic waveform can include one or more frequencies of from about 100 MHz to about 5 GHz. In the method, predicting and detecting the precursors can include a frequency spectrum in the radio frequency region and/or the microwave region.

Optionally, transmitting and receiving electromagnetic radiation can include transmitting and receiving electromagnetic radiation to and from a target imbedded within the dispersive medium. The method can also include improving image formation of the target using results of the predicted and detected formation and/or power decay of the one or more Brillouin precursors. In one embodiment, the method can also include making adjustments to better receive the one or more predicted Brillouin precursors. Optionally, making adjustments can include adjusting receiver schema to better accommodate frequency down-shifted Brillouin precursors.

In one embodiment, predicting and detecting can include performing sequential analysis for a plurality of input waveforms, which can optionally include but is not limited to electromagnetic waveform design, frequency domain analysis, time domain transient analysis, and/or combinations thereof. In the method, the analysis can be performed in the order of electromagnetic waveform design, frequency domain analysis, and transient analysis in the time domain.

Optionally, transmitting can include: employing the results from predicting and detecting to construct a shape of the transmitted electromagnetic radiation; employing the results from predicting and detecting to construct an attribute of the transmitted electromagnetic radiation; transmitting a plurality of modulated electromagnetic radiation; and/or transmitting sine-modulated electromagnetic radiation. In one embodiment, the dispersive medium can include a plurality of dispersive mediums.

The method can also include providing signal processing which provides a propagation factor such that the received electromagnetic radiation has a characteristic which is consistent with the transmitted radiation having only traveled through a substance featured by the propagation factor. Optionally, the signal processing provides an output consistent with the detection of a Brillouin precursor formation for the received electromagnetic radiation having only traveled through the substance featured by the propagation factor based. The method can also include encoding the transmitted electromagnetic radiation, which can optionally be performed by a plurality of encoding schemes such that the received signal is affected less by the dispersive material than would occur without one or more of the encoding schemes. In one embodiment, the electromagnetic radiated signal is the transmitted electromagnetic radiation or is optionally a form substantially similar to it.

An embodiment of the present invention also relates to a method for improving the electromagnetic spectrum remote sensing of a target, which includes predicting and detecting the formation and power decay of one or more Brillouin precursors for electromagnetic radiation passing through at least one dispersive media, determining the dielectric properties of at least one dispersive media between a transmitter and the target, transmitting and receiving electromagnetic radiation to and from the target through at least one dispersive media, and improving image formation of the target using the results of the predicting, determining, and receiving. Optionally, improving image formation can include increasing an amplitude level of the received electromagnetic radiation and/or reducing an amplitude of received noise. Optionally, an embodiment of the present invention can include detecting the formation of one or more Brillouin precursors which includes performing a frequency domain analysis of the received electromagnetic radiation.

Further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

One of the biggest advantages of the precursor waveforms is the algebraic decay of these waveforms in contrast to the exponential decay associated with single frequency or narrow-band EM waves.

Embodiments of the present invention permit the design of UWB RF and Microwave Remote Sensing systems for greater penetration depths, thereby providing better quality images at much larger distances through a given dispersive medium. Embodiments of the present invention preferably include a system set-up, a measurement procedure, and/or a data processing technique.

The system set-up can be designed according to the type of dispersive medium to be tested, and the appropriate frequency bands with suitable antennas to be used. In one embodiment, the invention can record the frequency response through the given media and can be used for any type of waveform, including but not limited to pulses or sequences of pulses, coded and/or non-coded. In last term, the result can be a simple and accurate observation of the Brillouin precursors. At this stage, measured data are optionally processed off-line to observe the precursors.

Figure 1:
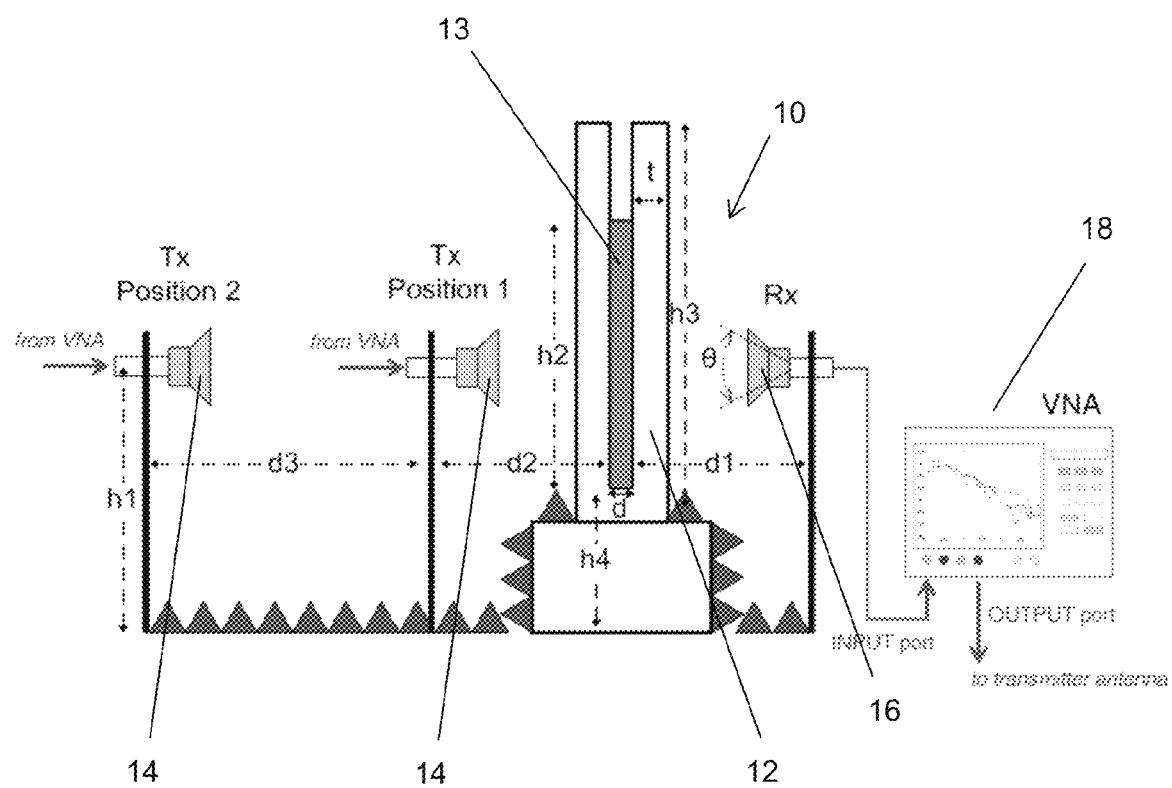
FIG. 1 is a drawing which illustrates a set-up diagram according to an embodiment of the present invention, indicating two possible placements for the transmitter antennas.

An embodiment of the system setup is illustrated in FIG. 1. In this embodiment, system 10 can include a material sample container 12, which holds material sample 13, two antennas 14 and 16, and vector network analyzer 18 (VNA). The VNA has one output port used for transmission, and one input port for reception. In one embodiment, any narrowband transmitter/receiver pair capable of covering the desired frequency band can be utilized to obtain the data instead of a VNA. In one embodiment, the transmitter antenna can be located in two different positions, as illustrated in FIG. 1. Although numerous materials and dimensions can be used and will provide desirable results, in one embodiment, the sample container can optionally be formed from an expanded foam material and can have dimensions as per FIG. 2. The dispersive material to be tested is preferably positioned inside container 12.

Figure 2A:
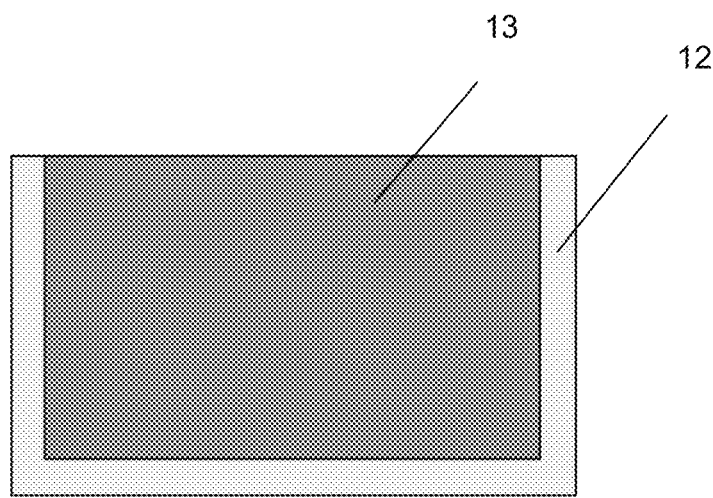
FIG. 2A-C respectively illustrate front, top and side views of a dispersive media container for an experiment in accordance with an embodiment of the present invention.
Figure 2B:
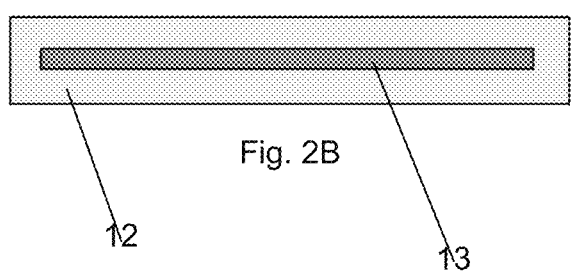
Figure 2C:
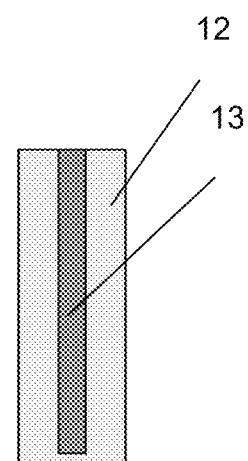

In the embodiment illustrated in FIG. 1, antennas 14 and 16 can be mounted on tripods, meters apart from sample 13. The antenna height is preferably chosen to avoid the ground reflections. The antenna beamwidth A in the E-plane and in the H-plane is preferably such that the pattern illuminates the sample holder or the container. The set-up geometry of this embodiment is schematically illustrated in FIGS. 1 to 4. FIGS. 2A-C respectively illustrate front, top, and side-views of an embodiment of container 12. The transmitter antenna is preferably connected to the output port of VNA, which transmits an appropriate output power level according to the losses introduced by the material under study. The receiver antenna can be connected to the test-set input port of VNA.

In an embodiment, a low noise amplifier (LNA) is preferably used in reception/transmission chain to compensate for the attenuation due to the material. Averaging can then be applied to the captured data to reduce the noise. A computer-based software (SW) program is optionally used to control the VNA configuration and to acquire the data for further processing.

In this embodiment, the VNA preferably sweeps over a frequency bandwidth W, transmitting each frequency at M discrete points. On the receiver side, the VNA captures the frequency response, $s_{21}(f)$, for M frequency points. So, the frequency resolution of the system is $\Delta f = W/M$. The data trace can be seen as a signal sampled in the frequency domain at a rate $\Delta f$. Then, the swept response in time domain, $x(t)$, can be obtained by applying a Fourier Transform of M points to the recorded responses $s_{21}(f)$. The time-domain can be transformed into a delay domain if the time instant regarding the main peak is taken as the delay origin. This peak is due to the signal component propagating through the given dispersive material. In this case, $x(t)$ is called the Power-Delay-Profile (PDP).

In order to ensure that $x(t)$ is not aliased, it is preferably verified that, the maximum time/delay component of the time signal $\tau_{max}$ satisfies:

$$\tau_{max} \leq \frac{1}{\Delta f} \quad (1)$$

The time signal $x(t)$ is also a discrete signal of M points. The resolution in time domain, or delay resolution, is given by:

$$\Delta \tau = \frac{1/\Delta f}{M} = \frac{1}{M \cdot \Delta f} = \frac{1}{W} \quad (2)$$

where $\Delta \tau$ indicates the delay resolution of the system. Finally, the following relationship must be verified:

$$\Delta \tau \geq \frac{\tau_{max}}{M} \quad (3)$$

Theoretical considerations regarding the separation between both antennas are preferably taken into consideration before the set-up is configured to ensure that the measurement process is correct and the results achieved are valid. Additionally, in order to be able to avoid or separate the multipath effects due to diffraction and reflections from the ground or any other element present in the measurement environment, intersection of Fresnel first ellipsoid is preferably ensured to be contained inside the frontal container slabs surface.

A more restrictive criterion can be adopted if it is decided that the 3 dB region, illuminated $A_{3dB}$ by the antenna radiation patterns, should be totally contained in the frontal material container slabs. For the particular case of rectangular horn antennas with radiation pattern aperture denoted by $A_E$ and $A_H$, in E-plane and H-plane, respectively, this geometrical restriction can be expressed as in (4)-(6):

$$H_1 = 2 \cdot d_1 \cdot \tan[(A_E/2) \cdot (\pi/180)] \quad (4)$$

$$H_2 = 2 \cdot d_1 \cdot \tan[(A_H/2) \cdot (\pi/180)] \quad (5)$$

$$A_{3dB} = H_1 \times H_2 = 4 \cdot d_1^2 \cdot \tan[(A_E/2) \cdot (\pi/180)] \cdot \tan[(A_H/2) \cdot (\pi/180)] \quad (6)$$

Figure 4:
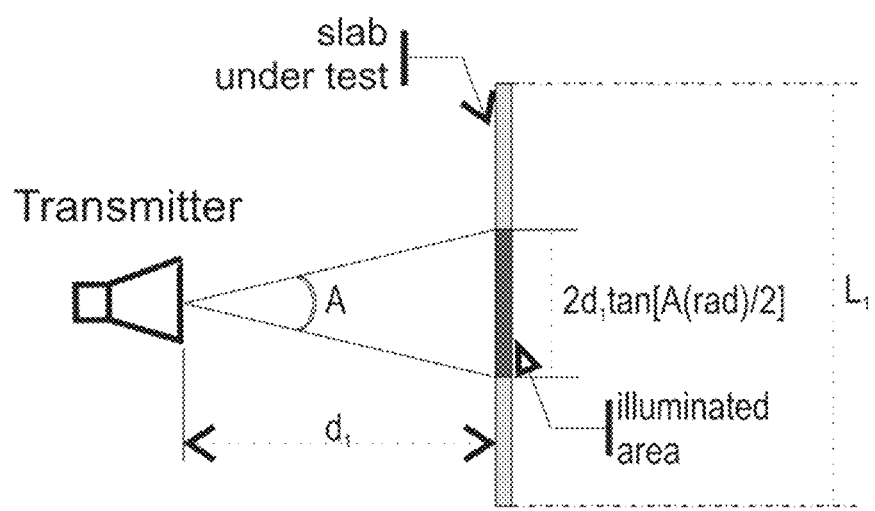
FIG. 4 is a diagram illustrating an antenna pattern illumination geometry for an embodiment of the present invention.

So, the region illuminated $A_{3dB}$ preferably has smaller area dimensions than the frontal and rear slabs of the sample container illuminated by the transmitter and receiver antennas, respectively. The geometry related to this criterion is illustrated in FIG. 4.

The Fraunhofer distance or far-field distance is not necessary to be met. Embodiments of the present invention can also be conducted under near field conditions.

In one embodiment, the measurement procedure is preferably based on the use of a VNA to provide the frequency response of dielectric dispersive material sample 13 under test by measuring the parameter $s_{21}(f)$ within a frequency range W. The VNA can be configured for continuous wave (CW) transmission mode.

Figure 3:
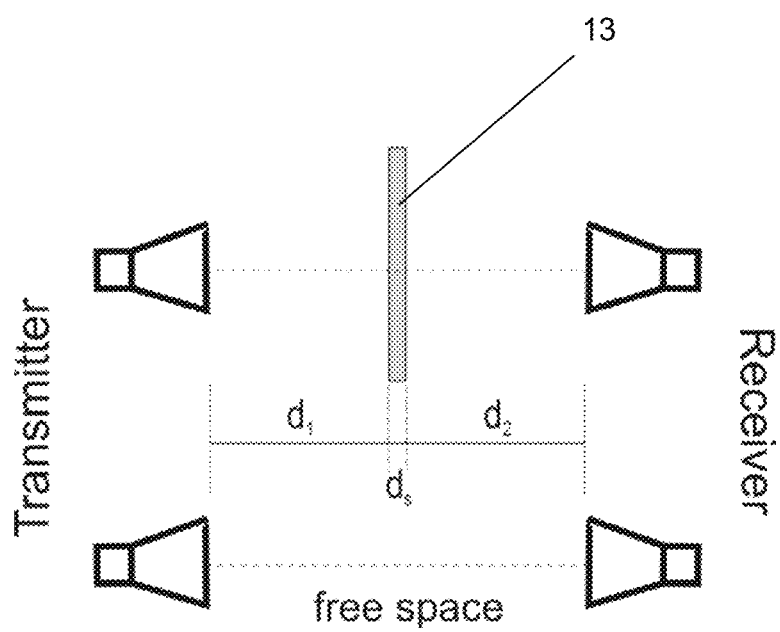
FIG. 3 is a schematic diagram of a measurement procedure indicating the first step undertaken in free space conditions (container not present), and the second step, with the container located between the transmitter and receiver antennas.

In one embodiment, the frequency response in free space, is preferably obtained and denoted as $s_{21\_freespace}(f)$. Then, the material under test is preferably placed inside container 12. The frequency response $s_{21\_obstacle}(f)$ for the dispersive material under test is then collected. FIG. 3 illustrates this measurement procedure in two steps: one for free-space conditions with the empty container, followed by another one with the filled container.

The ratio of these two measurements, in natural units, $s_{21\_freespace}(f)$ and $s_{21\_obstacle}(f)$ gives the propagation coefficient $T_{s21}$ experienced by the signal travelling through the dispersive material under study. It represents the ratio of the term $E^t$, that indicates the value of electric field transmitted through the obstacle, filling the container, i.e. dispersive material 12 and the term $E^i$ which corresponds to the value of the incident electric field at the interface of the two media, free-space and dispersive material.

The parameter $s_{21}(f)$ in free space conditions is preferably measured first. Later, container 12 is placed between antennas 14 and 16, and the parameter $s_{21}(f)$ is obtained for the central point of the slab and some adjacent points. Measuring in several points of the material is a technique valid to reduce the effect of material non homogeneity on the results achieved. In each point and for free-space situation, several measurements of the parameter $s_{21}(f)$ are obtained to perform averaging that reduces the noise power level and spurious events. FIG. 3 illustrates this two-step measurement procedure.

In one embodiment, the above $s_{21}(f)$ measurements can be done for vertical and horizontal polarizations in order to evaluate the isotropy and/or anisotropy of the dispersive material. Transmitter and receiver antennas use the same polarization. So, the values of $s_{21\_freespace\_VV}(f)$, $s_{21\_freespace\_HH}(f)$, $s_{21\_obstacle\_VV}(f)$, $s_{21\_obstacle\_HH}(f)$, all at normal angle of incidence of the transmitted signal, can be obtained.

In one embodiment, the signal processing starts with a time filtering applied to the $s_{21}(f)$ parameters. A power delay profile (PDP) can be obtained by using an Inverse Fourier Transform on $s_{21}(f)$ parameters. An ideal PDP would show just one peak centered at $\tau_0$ and with duration $[\tau_0 - \Delta \tau, \tau_0 + \Delta \tau]$ where $\Delta \tau$ is the system time resolution. The presence of undesired propagation components can result in additional minor peaks in the PDP. A time gating filter is preferably applied to the PDP to ensure that only the direct component of the transmitted signal is present.

Figure 5:
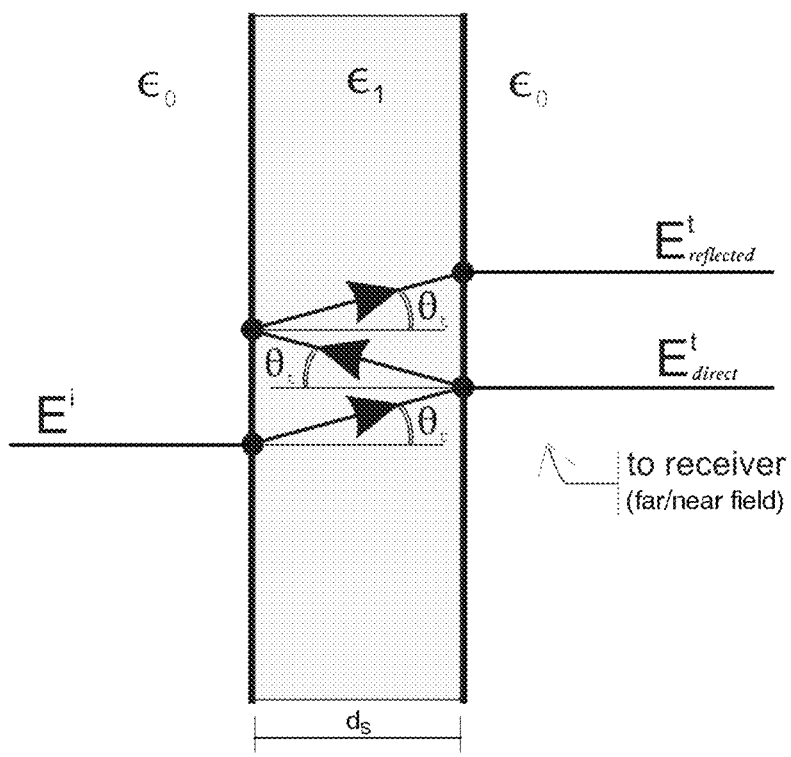
FIG. 5 is a drawing illustrating direct and main reflected components.

A rigorous criterion to decide the time domain filter configuration is preferably defined. Embodiments of the present invention also comprise criterion to fix the filter parameters, center time and time width, based on the geometrical consideration of the material under study as illustrated in FIG. 5. This plot illustrates the presence of the direct component and the reflected version in the material under study.

Under ideal conditions, the direct component presents a related delay given by $\tau_0$ for the case of normal incidence:

$$\tau_0 = [d_1 + d_s \cdot \tan(\theta_t) + d_2]/c \quad (7)$$

where c is the speed of light, approximately $3 \cdot 10^8$ m/s. According to FIG. 5, the closest reflected component that can reach the receiver antennas is given by $\tau_1$:

$$\tau_1 = [d_1 + 3d_s \cdot \tan(\theta_t) + d_2]/c \quad (8)$$

with $d_1$, $d_2$, $d_S$ and $\theta_t$ as per FIG. 5 with the geometry described in FIG. 3 and FIG. 4, and c the speed light in vacuum about $3 \cdot 10^8$ m/s.

The delay difference between the two components, $\Delta \tau_{10}$, indicates the time difference with respect to the next multipath component present in the PDP. The related peak to this secondary peak is preferably eliminated by the time filter.

$$\Delta \tau_{10} = \tau_1 - \tau_0 = [2d_s \cdot \tan(\theta_t)]/c \quad (9)$$

Combining $\Delta \tau_{10}$ and the resolution of the system $\Delta \tau$ we obtain the time filter width in number of samples, n:

$$n = \left\lfloor \frac{\Delta \tau_{10}}{\Delta \tau} \right\rfloor \quad (10)$$

So, in the PDP, we can apply a rectangular time window centered at $\tau_0$ and with time duration $[\tau_0 - \Delta \tau/2, \tau_0 + \Delta \tau/2]$, or equivalently n samples.

In one embodiment, a filtering alternative is preferably given by the use of a Gaussian filter with the following expression:

$$g(t) = \exp\{-[(t-a)/b]^2\} \quad (11)$$

with values of $a=\tau_0$ and $b=2\cdot\Delta\tau$. One less restrictive option can be given by selecting $a=b=\tau_0$.

Figure 6A:
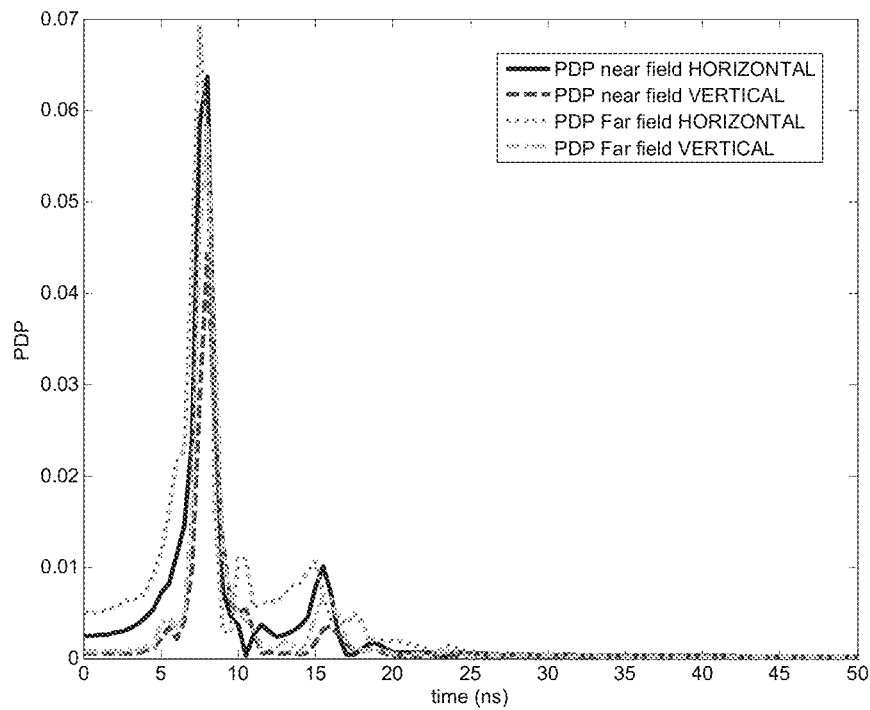
FIGS. 6A and B respectively filtered and non-filtered power delay profiles.
Figure 6B:
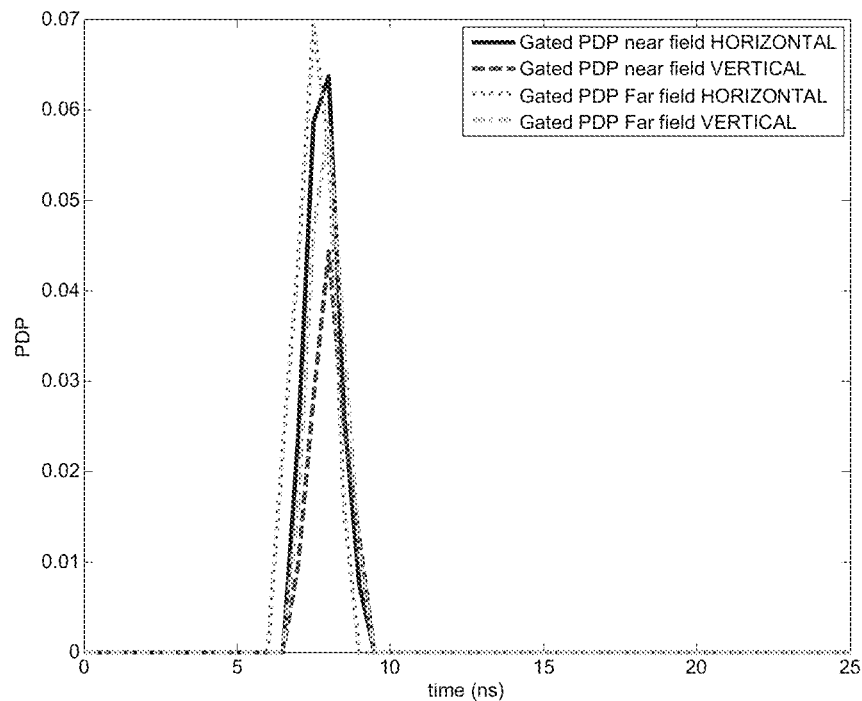

FIGS. 6A and B illustrate a PDP, both non-filtered and filtered respectively. Anomalies are optionally observed due to multipath components. These impairments affect the reconstruction and the accuracy of the resultant Brillouin precursors.

The following step in the signal processing is to perform the ratio of the time filtered $S_{21}$ parameters. The result is the propagation factor $T_{s21}$ containing the resulting amplitude and the phase of the electromagnetic wave propagating through a given dispersive material at various frequency components making up the transmitted signal. The ratio of both $S_{21}$ parameters, one without the material and one with the material, ensures that only the material influence is present in $T_{s21}$. After time gating, the propagation factor $T_{s21}$ is preferably designated as $T'_{s21}$.

In one embodiment, the last step within the signal processing stage is to build the transmitted pulse of interest p(t) as given in (12). The pulse modulates a sinusoidal wave with carrier frequency $f_0$. This pulse passes through the gated frequency response $T'_{s21}$ as a frequency filter or channel response, as indicated in (13). This will model the behavior of the different spectral components of the pulse p(t). The final result, y(t) or equivalently its spectral counterpart, Y(f) given in (14), is the signal affected by the dispersion phenomenon caused by the dispersive properties of the propagating medium.

$$p(t) = \prod\left(\frac{t}{T_b}\right) \cdot \sin(2\pi f_0 t) \quad (12)$$

$$y(t) = p(t) \otimes \text{IFFT}\{T'_{s21}(f)\} \quad (13)$$

$$Y(f) = P(f) \cdot T'_{s21}(f) \quad (14)$$

Figure 7:
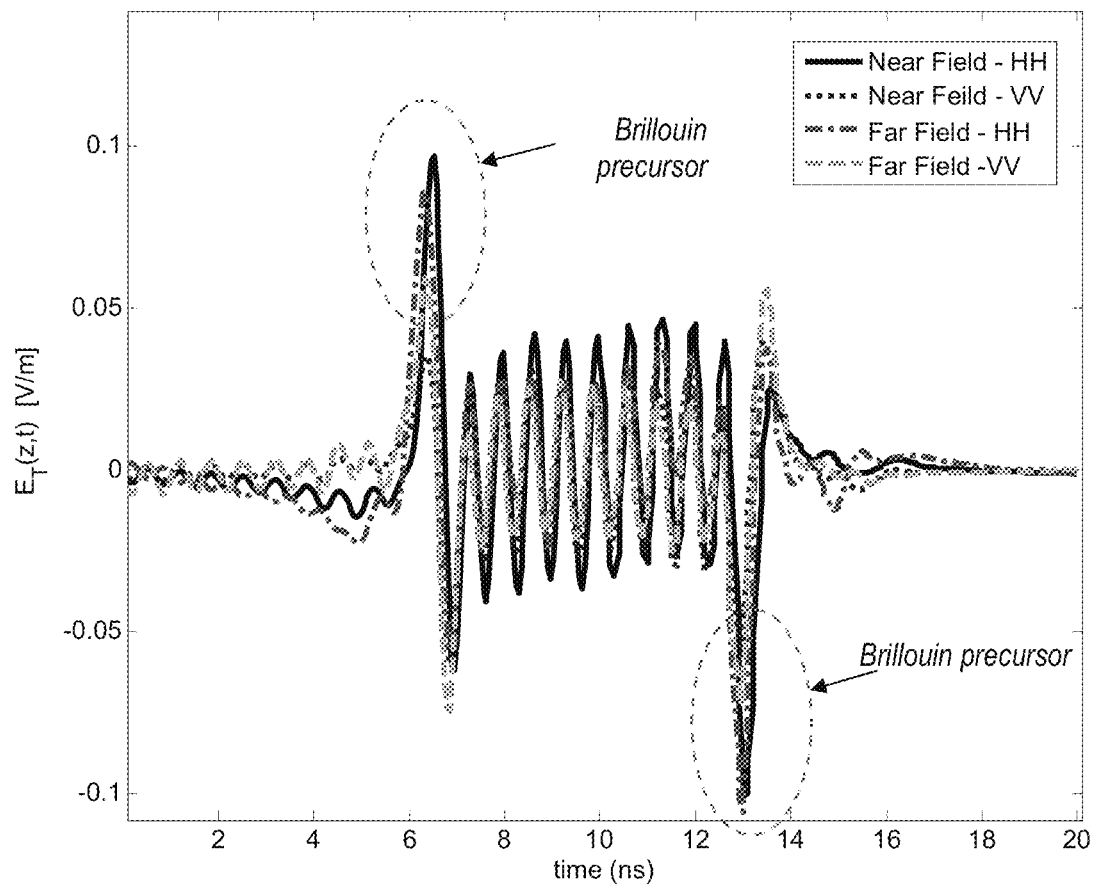
FIG. 7 is a graph which illustrates a received signal with a superimposed Brillouin precursor according to an embodiment of the present invention.

Once obtained, Y(f) is then transformed into the time domain, thus, revealing the dynamical evolution of the pulse p(t) after travelling through the dispersive media. The Brillouin precursors appear as a superimposed wave on the leading and trailing edges of y(t), as illustrated in FIG. 7. The results in FIG. 7 correspond to the example data obtained and described herein in the Industrial Applicability example.

Optionally, all parameters controlling the pulse shape and the sinusoidal carrier frequency can easily be changed, within the constraints given by the bandwidth covered during the measurement stage. This permits fully software-controlled method(s) and/or systems to be applied on the same captured data, thereby providing the analysis of the Brillouin precursors corresponding to various transmitted pulses. This embodiment of the present innovation is extremely powerful, for it allows optimizing the detection of the Brillouin precursors for various dispersive materials. This would be very useful in commercializing this innovation, because a remote sensing system designed for one application can easily be ported for another with minimal hardware modifications.

The Brillouin precursor waveforms can provide larger penetration depths into a given dispersive medium compared to that achieved by conventional single frequency or narrow-band signals. This simply means that a signal with the proper shape and frequency components can travel longer distances for than a similarly-powered signal without the proper shape and frequency components. Therefore, embodiments of the present invention provide a revolutionary step in the design of UWB Radio Systems, such as UWB Radar and Remote Sensing Systems, digital communication systems, medical imaging systems, etc. Additionally, because of the enhanced distance, embodiments of the present invention provide the ability for lower-powered systems than that of conventional systems, and with the same range and data transmission capacities.

Embodiments of the present invention can optionally be used in RF and Microwave Remote Sensing Systems. This is because embodiments of the present invention have the ability to enhance and optimize the following fields and/or applications:

a. Ground-penetrating Radar (GPR) systems, by providing deeper penetration depths, thereby enabling the GPR systems to look deep into the subsurface for detection of various structures, man-made or otherwise. It can also be used in mining, oil exploration, bridge inspection, environmental degradation of soil, geology, subsurface voids, caves, tunnels, etc.;

b. Military systems, particularly airborne synthetic aperture radar (SAR) systems designed to image enemy formations concealed under forest canopies. Deeper penetration into the forest canopy and stronger returns can provide better imaging quality. It can also enhance communications in dense forested areas;

c. Imaging through walls is also enhanced because of the ability to provide better imaging of the interiors of the buildings (for example in homeland security applications;

d. High resolution and imaging radar systems. In most radar systems, the non-presence of dispersion would be reasonable to assume, since the dispersion is too weak for dry-air operational conditions, and the frequency bands of many radar systems are not wide enough to show an important effect of dispersion. However, for radar imaging systems (imaging radar), the range resolution is preferably proportional to the frequency bandwidth used. As a result, high-resolution systems require UWB waveforms (>500 MHz), and for such pulses, the dispersion phenomenon, particularly in dispersive media is of great importance. The ability to use the precursor waveforms also greatly enhances the image quality at much larger distances within a given medium; and e. Systems employed to conduct the remote monitoring of the Earth's surface covered with vegetation, snow, etc. The lower attenuation experienced also ensures an optimal return wave by part of a signal with a Brillouin precursor component. This of course includes, but is not limited to, satellite-based remote sensing instruments.

Embodiments of the present invention can optionally be used in:

a. Radiation dosimetry and exposure to electromagnetic fields. Brillouin precursors are particularly useful in medical treatment by radiotherapy, or tumor detection, to facilitate tissue penetration with less power than other waves, thus reducing potential damage and adverse effects. Because of this, embodiments of the present invention can reduce radiation dosimetry and exposure to electromagnetic sources, thereby increasing standards of protection for patients. Embodiments of the present invention can provide significant improvements in radar imaging (for example, magnetic resonance imaging);

b. Non-destructive Testing. Most non-destructive testing is done on materials that are inherently dispersive. Additionally, it requires extremely large bandwidths to obtain a finer resolution for proper diagnostics. Therefore, the ability to use precursor waveforms will greatly enhance the imaging quality as well as the penetration depth for such testing;

c. Digital Communications. The new and emerging radio communications use even larger bandwidths to achieve higher data rates for various applications. Thus, depending upon the environmental conditions, the propagation medium that is normally considered non-dispersive must necessarily be considered as dispersive. The use of precursors can be advantageous in terms of providing either the same range and less power consumption or a longer range with the same amount of power. Therefore, it can reduce costs for radio communications, communication links, transmission data rate, number of users, combinations thereof and the like;

d. Underground and underwater communications. The low attenuation suffered due to the formation of Brillouin precursor can be particularly useful in communications under land and under water (underground/undersea), for both military and non-military applications. For instance, the development of underground sensor networks can enable the monitoring of parameters such as humidity, and salinity, which are particularly useful in agricultural applications;

e. Absorbent materials. Embodiments of the present invention also permit the creation of new materials that maximize or minimize the absorption of the Brillouin precursor waves, including but not limited to electromagnetic shielding and military applications, such as stealth technologies. Embodiments of the present invention can also be used to enhance the development of smart materials that offer a response (transparent or opaque) at a particular frequency or wavelength range;

f. Instrumentation design. For both purposes of production and observation of the Brillouin precursors, specific instrumentation can be designed and implemented; and g. Material Characterization. The frequency response component $s12(f)$ provides information regarding both magnitude and the phase of the waveforms propagating through a given material. Thus, providing a powerful tool to obtain various magnetic and dielectric properties of a given dispersive material.

An embodiment of the present invention provides the ability to work in the frequency domain. This simplifies the required instrumentation and enables the measurement method to be independent of the type and shape of the transmitted pulse. Because of the ability to work in the frequency domain, a system can be assembled with relative ease and at a price that would make it accessible to almost all users, thereby making mass production much cheaper. In one embodiment, a pulse can be configured using software-controlled methods applied on the frequency response $s_{21}(f)$ measured during experiments. By this way, the Brillouin precursors are obtained for any kind of pulse and material. Thus, embodiments of the present invention are not constrained to be used in any one system. Rather, they can be used in numerous diverse fields which includes but is not limited to remote sensing of soil, foliage, walls, human tissues, communication through foliage and seawater, non-destructive testing, material characterization, combinations thereof, and the like. Because the processing system can be hardware-independent systems of the present invention can provide the ability to easily use various signal processing techniques in real time because the processing system can be hardware-independent.

Embodiments of the present invention can also: provide a fast and simple procedure to obtain the required frequency responses; be independent of the type and shape of the pulse(s) to be considered; provide an accurate estimate of the amplitude level for an observed precursor; provide the ability to detect precursors and perform analysis using monopulse or multipulse waveforms, as digital sequences used in wireless communications, and/or pulse shapes based on non-rectangular waveforms; enable an easy and non-exhaustive control of the environmental measurement conditions for the dispersive material including but not limited to temperature, humidity, and/or salinity; conduct experiments using only a few instruments; enable the observation in the microwave region that is widely used for a large number of day-to-day applications; enable economically affordable end products, thereby making it available to a much wider and larger user community; provide a compact and/or portable system and/or subsystem which can be used in conjunction with existing microwave systems. Since the Brillouin precursors provide much of the enhancements in terms of penetration depth through a given dispersive material and these are realized through digital processing, system portability is enhanced because of the low power and narrow band transmit systems that can easily be manufactured and utilized in such applications. Such systems, though subject to the dimensions and the weight of underlying components, can easily be moved on a hand-drawn cart and carried on a backpack and/or made available in a hand-held unit.

Embodiments of the present invention also provide the ability to provide a core hardware system that can easily be ported, and/or requires minimal hardware changes for upgrading for various applications by simply changing the processing software and algorithms, such software updates and can also modify the signal processing and presentation formats for the results.

Embodiments of the present invention can be used in digital communications, including but not limited to mobile, wireless, and radio broadcasting service providers; military and civil radars, including but not limited to air traffic control, ground penetrating radar, and the like; medical imaging equipment; oil and/or gas drilling and/or imaging; satellite-based systems, including civilian as well as military; portable and/or handheld radio devices, because of the reduced power requirement that can enhance the battery life.

In one embodiment, the apparatus and/or system of the present invention can include a general or specific purpose computer or distributed system programmed with computer software implementing the steps described above, which computer software may be in any appropriate computer language, including C++, FORTRAN, BASIC, Java, assembly language, microcode, distributed programming languages, etc. The apparatus and/or system may also include a plurality of such computers/distributed systems (e.g., connected over the Internet and/or one or more intranets) in a variety of hardware implementations. For example, data processing can be performed by an appropriately programmed microprocessor, computing cloud, Application Specific Integrated Circuit ("ASIC"), Field Programmable Gate Array ("FPGA"), or the like, in conjunction with appropriate memory, network, and bus elements.

Note that in the specification and claims, "about" or "approximately" means within twenty percent (20%) of the numerical amount cited. All computer software disclosed herein may be embodied on any computer-readable medium (including combinations of mediums), including without limitation CD-ROMs, DVD-ROMs, hard drives (local or network storage device), USB keys, other removable drives, ROM, and firmware. The medium and/or mediums can optionally be physical and/or non-transitive.

In one embodiment, the present invention can be used with more than one kind of pulse; does not require to divide the sine carrier modulated pulse and both divided signals are phase modulated to produce the phase reversal; it can detect the Brillouin precursor that arises out due to the propagation of any input signal through a specific dispersive medium; and/or can measure the natural formation of a Brillouin precursor for any kind of transmitted signal travelling through a dispersive medium, optionally, the medium can be placed inside a container or it could be anywhere in the path of the transmitted signal; provides the ability for the detection of Brillouin precursor independent of the shape and form of the pulse. Embodiments of the present invention can be used in a laboratory setting or can be used in a non-indoor environment for distances without other constraint that are given by the transmitted power and/or the total system power budget, including but not limited to systems which can be used at distances in excess of 100 miles; embodiments of the present invention can be incorporated into an existing system with minor modifications An embodiment of the present invention requires the correlation between the transmission and reception of a signal in the frequency domain which is equivalent to the time domain via inverse transform. Another embodiment of the present system could be extended not only to estimate the possible presence of a subsurface object but also to enhance the detection of a subsurface object and provide better imaging capabilities. Embodiments of the present invention can detect Brillouin precursors formed through a dispersive medium and can be used in a frequency range wherein dispersion phenomenon does occur. In one embodiment, the present invention does not require the development of materials with specific properties.

INDUSTRIAL APPLICABILITY

The invention is further illustrated by the following non-limiting example conducted to validate an embodiment of the present invention.

Example 1

FIG. 1, illustrate a first setup according to an embodiment of the present invention. As illustrated in the figure, this setup contained a sample container, antennas, vector network analyzer (VNA), all according to an embodiment of the present invention. Transmission antennas can be located in far field (position 1) or near field (position 2) conditions with the same set-up.

In this example, the container was filled with 100 gallons of tap water, and the measurements were conducted for horizontal and vertical polarizations. In this set-up, an AGILENT TECHNOLOGIES E8362B PNA was used to collect the frequency responses $s_{21}(f)$. The LNA used had a power gain of about 25 dB in the range from about 10 MHz to about 4.2 GHz with a flatness level of about ±1.5 dB. The cable used in the transmitter side was about 3 m length, and in the receiver side it was about 2.5 m in length. Two antennas were used at both transmission and reception ends to cover the band covered from 100 MHz to 2.5 GHz. All the antennas used consisted of quad rigid horns with a diagonal length of 0.3683 m, and 3 dB beam width (θ) of 60°. The transmit power of the VNA analyzer has been chosen to be 0 dBm, with the VNA frequency sweep settings given by 6400 no. of points, 192 ms sweep time and 20 averaging factor.

At an upper limit frequency of 2.5 GHz in the VNA sweep, the wavelength was about 0.2 m, and the corresponding Fraunhofer distance was about 2.26 m, for each antenna, and was about 2.68 m at 1.0 GHz. This means that the separation distance $d_2+d_3$ selected for the transmission measurements was about 4.5 m, enough to have far field conditions. The near field measurements with a separation distance $d_2=1$ m were also conducted, verifying the far-field results.

Figure 8A:
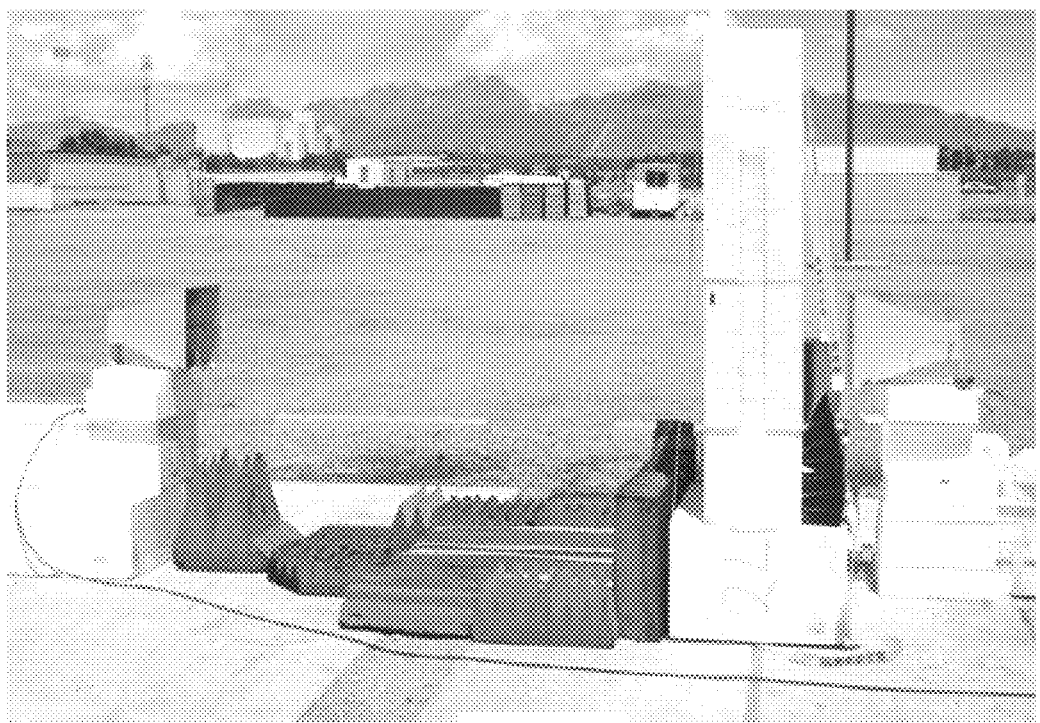
FIGS. 8A-C illustrate a set-up according to an embodiment of the present invention.
Figure 8B:
Figure 8C:
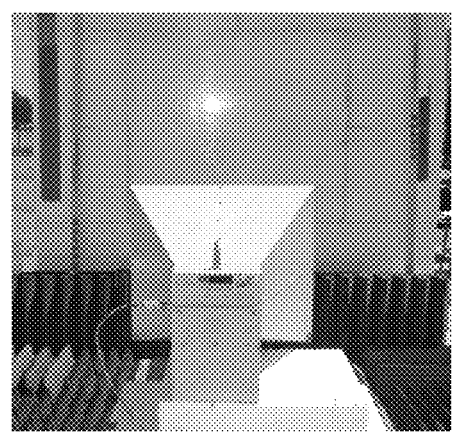

The container which held the tap water was made of expanded foam with ~15 cm thickness and relative permittivity of ~1. The dimensions of the expanded foam box were such that almost the entire 3 dB beamwidth of 60° fell on the complete frontal and rear surface of the water. Absorbing electromagnetic (EM) foams were placed on the ground to minimize the ground reflections. Other dimensions of the setup in FIG. 1 were: water depth, d=10 cm; antenna height $h_1=1.25$ m; water height $h_2=1.2$ m; and the water base from ground, $h_3=0.65$ m. The total width 2t+d (not shown) of the box was about 2 m. FIGS. 8A-C present the picture and the geometrical dimensions of the setup.

Figure 9:
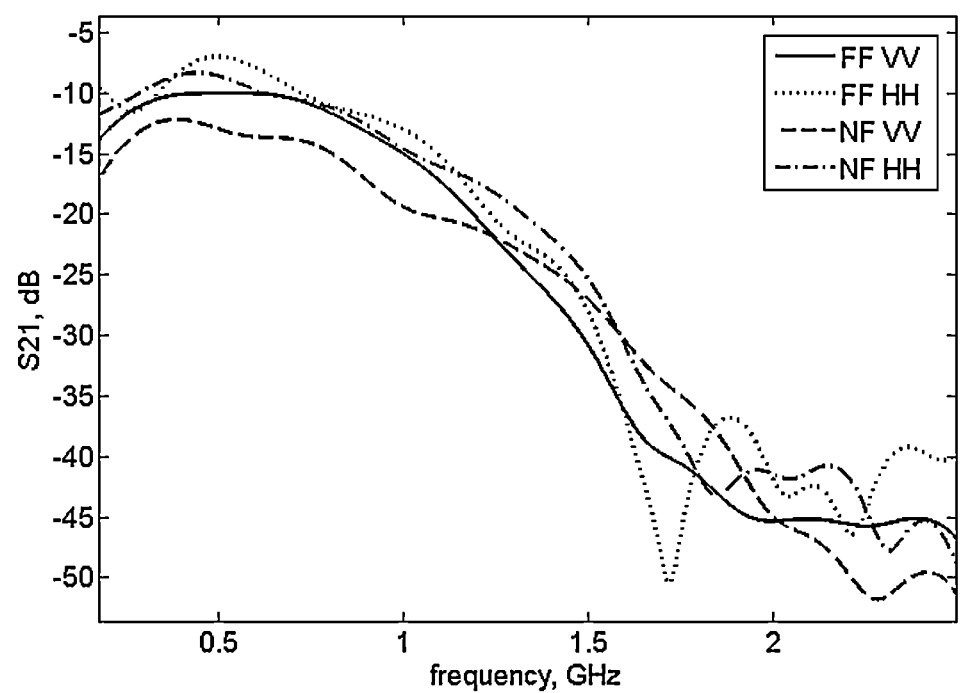
FIG. 9 is a graph which illustrates the magnitude of the time-gated $s_{21}(f)$ data corresponding to NF and FF for both vertical-vertical (VV), and horizontal-horizontal (HH) configurations.

The VNA was calibrated using 'thru' calibration excluding the antennas and the container. Firstly, the $s_{21}(f)$ was recorded for the container without water. Later, the container was filled with the tap water and the S-parameters $s_{21}(f)$ were recorded after moving the transmission and reception antennas a distance d/2 apart to maintain the reference distance $d_2+d_3$. The $s_{21}(f)$ data corresponding to different distance (far and near field) and polarization (vertical and horizontal) conditions were obtained, and the corresponding power delay profile (PDP) generated. The PDP data were time gated using a Gaussian gating function to remove various spurious and multiple reflections. FIG. 9 illustrates the magnitude of $s_{21}(f)$ time-gated data corresponding to NF and FF for both vertical-vertical (VV), and horizontal-horizontal (HH) configurations.

The off-line processing was applied to obtain related outputs Y(f) or y(t) and the superimposed Brillouin precursors, if any. For the time gating, a Gaussian filter was selected with b=6.42 ns.

Figure 10:
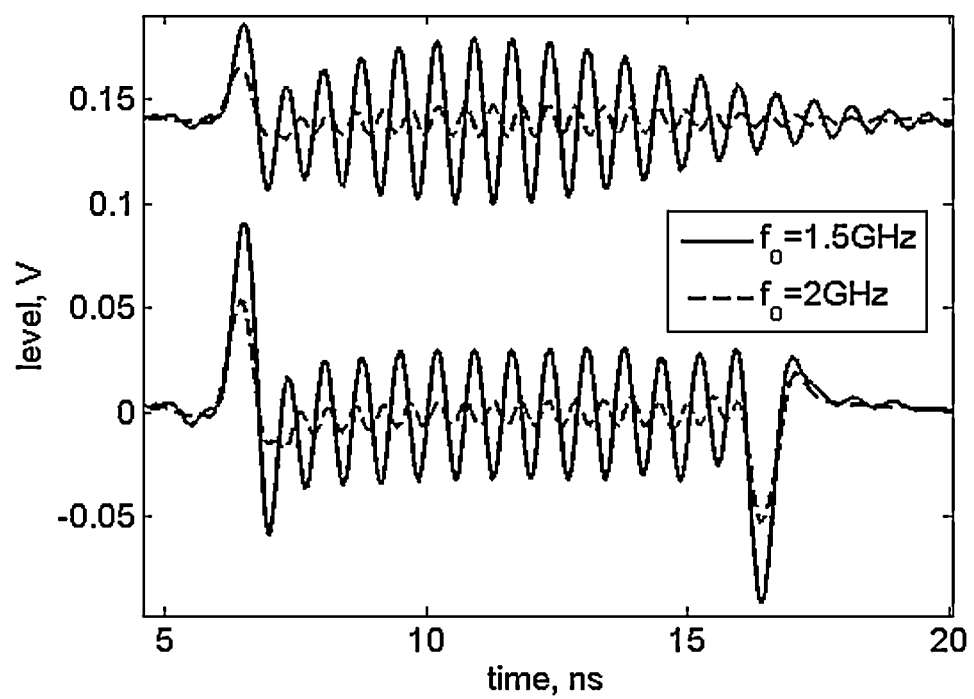
FIG. 10 is a graph which illustrates the processed results for sine-modulated rectangular and for Gaussian pulses, 15-cycle each, at carrier frequency $f_0=1.5$ GHz and 2 GHz, using the FF VV data illustrated in FIG. 9.

FIG. 10, illustrates the processed results for sine-modulated rectangular and for Gaussian pulses, with a time duration $T_b=15/f_0$ or equivalently 15-cycle of carrier frequency each, at carrier frequency $f_0=1.5$ GHz and 2 GHz, using the FF VV data illustrated in FIG. 9. Brillouin precursors corresponding to both types of pulses are clearly visible at the rising and falling edge of the rectangular pulse, and only at the rising edge of the Gaussian pulse. Similar results were obtained using data from other configurations. It can also be noted that the proposed technique is general enough to lend itself readily to any type (and shape) of the pulse at any carrier frequency within the constraints imposed by the frequency contents of the recorded data.

In conclusion of this example, the method, system, and technique of this embodiment of the present invention has been successfully used in studying the Brillouin precursors propagating through a 10 cm deep tap water. The method, system, and technique are general enough to be applied on pulses of any type and shape and at any carrier frequency, within the constraints given by the bandwidth covered during the measurement stage. The pulse under consideration can be re-constructed using the software-controlled methods applied on the measured data. This simplifies the required hardware, enabling analysis to be conducted using simple laboratory instruments. The method, system and technique is not constrained to be used for a particular application, rather it can find its use in numerous diverse fields ranging from remote sensing of soil, foliage, walls to human tissues, combinations thereof, and the like. Additionally, the method, technique, and system, being hardware-independent, readily lend themselves to analyze precursor waveforms for any dispersive medium.

The preceding example can be repeated with similar success by substituting the generically or specifically described reactants and/or operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A method for improving electromagnetic propagation through a dispersive medium, the method comprising:
   predicting and detecting the formation and power decay of one or more Brillouin precursors in the frequency domain for an electromagnetic radiated signal passing through the dispersive medium;
   transmitting and receiving electromagnetic radiation through the dispersive medium; and
   making changes to either the transmitted electromagnetic radiation or to signal processing for the received electromagnetic radiation based on the one or more detected Brillouin precursors.

2. The method of claim 1 wherein the changes are made to the transmitted electromagnetic radiation.

3. The method of claim 1 wherein making changes comprises adaptively making changes to either the transmitted electromagnetic radiation or to signal processing for the received electromagnetic radiation.

4. The method of claim 1 wherein the changes are made to the signal processing for the received electromagnetic radiation.

5. The method of claim 1 wherein the transmitted electromagnetic radiation comprises a radio frequency signal.

6. The method of claim 1 wherein the transmitted electromagnetic radiation comprises a microwave frequency signal.

7. The method of claim 1 wherein the transmitted electromagnetic radiation comprises any modulated electromagnetic waveform within a frequency range from about 100 MHz to about 5 GHz.

8. The method of claim 1 wherein predicting and detecting the one or more precursors comprises a frequency spectrum in the radio frequency region.

9. The method of claim 1 wherein predicting and detecting the one or more precursors comprises a frequency spectrum in the microwave region.

10. The method of claim 1 wherein transmitting and receiving electromagnetic radiation comprises transmitting and receiving electromagnetic radiation to and from a target imbedded within the dispersive medium.

11. The method of claim 10 further comprising improving image formation of the target using results of the predicted and detected formation and power decay of the one or more Brillouin precursors.

12. The method of claim 1 further comprising making adjustments to better receive the one or more predicted Brillouin precursors.

13. The method of claim 12 wherein making adjustments comprises adjusting the signal processing for the received electromagnetic radiation to better accommodate frequency down-shifted Brillouin precursors.

14. The method of claim 1 wherein the predicting and detecting comprises performing sequential analysis for a plurality of input waveforms.

15. The method of claim 14 wherein the analysis comprises an element selected from the group consisting of electromagnetic waveform design, frequency domain analysis, time domain transient analysis, and combinations thereof.

16. The method of claim 14 wherein the analysis is performed in the order of electromagnetic waveform design, frequency domain analysis, and transient analysis in the time domain.

17. The method of claim 1 wherein transmitting comprises employing results from predicting and detecting to construct a shape of the transmitted electromagnetic radiation.

18. The method of claim 1 wherein transmitting comprises employing results from predicting and detecting to construct an attribute of the transmitted electromagnetic radiation.

19. The method of claim 1 wherein transmitting electromagnetic radiation comprises transmitting a plurality of modulated electromagnetic radiation.

20. The method of claim 19 wherein transmitting electromagnetic radiation comprises transmitting sine-modulated electromagnetic radiation.

21. The method of claim 1 wherein the dispersive medium comprises a plurality of dispersive mediums.

22. The method of claim 1 further comprising providing signal processing which provides a propagation factor such that the received electromagnetic radiation has a characteristic which is consistent with the transmitted radiation having only traveled through a substance featured by the propagation factor.

23. The method of claim 22 wherein the signal processing provides an output consistent with the detection of a formation of the one or more Brillouin precursors for the received electromagnetic radiation having only traveled through the substance featured by the propagation factor based.

24. The method of claim 22 further comprising encoding the transmitted electromagnetic radiation.

25. The method of claim 22 wherein encoding the transmitted electromagnetic radiation is performed by a plurality of encoding schemes such that the received signal is affected less by the dispersive material.

26. The method of claim 1 wherein electromagnetic radiation is the transmitted electromagnetic radiation.

27. A method for improving the electromagnetic spectrum remote sensing of a target comprising:
   predicting and detecting the formation and power decay of one or more Brillouin precursors for electromagnetic radiation passing through at least one dispersive media;
   determining the dielectric properties of at least one dispersive media between a transmitter and the target;
   transmitting and receiving electromagnetic radiation to and from the target through at least one dispersive medium; and
   improving image formation of the target using the results of the predicting, determining, and receiving by adjusting either the transmitted electromagnetic radiation or signal processing for the received electromagnetic radiation.

28. The method of claim 27 wherein improving image formation comprises increasing an amplitude level of the received electromagnetic radiation.

29. The method of claim 27 wherein improving image formation comprises reducing an amplitude of received noise.

30. The method of claim 27 wherein predicting and detecting comprises performing sequential analysis for a plurality of input waveforms.

31. The method of claim 30 wherein the analysis is selected from the group consisting of electromagnetic waveform design, frequency domain analysis, time domain transient analysis, and combinations thereof.

32. The method of claim 27 wherein detecting the formation of one or more Brillouin precursors comprises performing a frequency domain analysis of the received electromagnetic radiation.

33. A method and technique for detecting Brillouin precursors in radio-frequency and microwave frequency domain for improving electromagnetic propagation through a given dispersive medium, the method comprising:
   selecting electromagnetic frequencies for transmission through the given dispersive medium such that Brillouin precursors can be realized at the reception;
   making changes to an amplitude, phase, and shape of the electromagnetic frequencies for realization of the Brillouin precursors;
   modifying system configuration to receive frequency-downshifted electromagnetic signals such that the precursors can be detected; and
   performing signal processing on the received electromagnetic signal such that the Brillouin precursors can be realized.

34. The method of claim 33 wherein the shape and frequency content of transmit waveforms are optimized and tailored to optimize the precursor formation.

35. The method of claim 34 wherein a suitable and appropriate band of electromagnetic frequencies for transmission are selected to enable the Brillouin precursor formation on reception.

36. The method of claim 33 further comprising coding the transmitted electromagnetic radiation.

37. The method of claim 33 wherein selecting frequencies for transmission comprises adaptively selecting distinct frequencies for transmission based on an element selected from a list consisting of a response received from the given dispersive medium, prior knowledge about the given dispersive medium, and a combination thereof.

38. The method of claim 33 wherein modifying the receiving system configuration comprises optimizing it for the reception of the frequency-downshifted electromagnetic signals.

39. The method of claim 33 further comprising applying signal processing techniques that establish an underlying propagation factor representing characteristics of the given dispersive medium and performing further signal processing to obtain the Brillouin precursors.

* * * * *